(12) United States Patent
Pohan

(10) Patent No.: US 9,476,995 B2
(45) Date of Patent: Oct. 25, 2016

(54) X-RAY DETECTOR

(71) Applicant: SIEMENS AKTIENGESELLSCHAFT, Munich (DE)

(72) Inventor: Claus Pohan, Baiersdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 219 days.

(21) Appl. No.: 13/950,364

(22) Filed: Jul. 25, 2013

(65) Prior Publication Data

US 2013/0306877 A1 Nov. 21, 2013

(30) Foreign Application Priority Data

Aug. 3, 2012 (DE) ........................ 10 2012 213 814

(51) Int. Cl.
*G01T 7/00* (2006.01)
*G01T 1/29* (2006.01)

(52) U.S. Cl.
CPC ............... *G01T 7/00* (2013.01); *G01T 1/2985* (2013.01)

(58) Field of Classification Search
CPC .... A61B 6/032; A61B 6/4411; A61B 6/035; G01T 1/2018; G01T 1/2985; G01T 1/243; G01N 2223/419; G01N 23/046; G21K 1/025; H01L 27/14623
USPC ................. 250/394, 370.09, 370.11, 363.05; 257/E27.14; 378/4
See application file for complete search history.

(56) References Cited

U.S. PATENT DOCUMENTS

| 6,249,563 | B1* | 6/2001 | Snyder ................ G01N 23/046 378/19 |
| 7,379,528 | B2* | 5/2008 | Mattson et al. ................ 378/19 |
| 7,564,940 | B2* | 7/2009 | Mattson et al. ................ 378/19 |
| 2001/0025928 | A1 | 10/2001 | Apotovsky |
| 2004/0013225 | A1* | 1/2004 | Gregerson ............. A61B 6/032 378/19 |
| 2006/0023835 | A1* | 2/2006 | Seppi ................... G01N 23/046 378/57 |
| 2006/0045237 | A1* | 3/2006 | Schweinert ........... A61B 6/032 378/19 |
| 2006/0165214 | A1 | 7/2006 | Mattson et al. |
| 2008/0061395 | A1* | 3/2008 | Tkaczyk ............... G01T 1/2985 257/443 |

(Continued)

FOREIGN PATENT DOCUMENTS

| CN | 100374878 C | 3/2008 |
| CN | 102565847 A | 7/2012 |

(Continued)

OTHER PUBLICATIONS

Office Action for Chinese Patent Application No. 201310331427.5 dated Jul. 2, 2015 and English translation thereof.

(Continued)

*Primary Examiner* — David Porta
*Assistant Examiner* — Blake Riddick
(74) *Attorney, Agent, or Firm* — Harness, Dickey & Pierce, P.L.C.

(57) ABSTRACT

An x-ray detector, especially for a computed tomograph, includes a number of detector modules arranged next to one another in a stacking direction with a front side, which during operation is oriented towards an x-ray source, and with a rear side lying opposite the front side. For screening against x-rays which pass during operation through an installation between two adjacent detector modules, an absorption element is positioned on the rear side of the two adjacent detector modules.

20 Claims, 3 Drawing Sheets

(56) References Cited

U.S. PATENT DOCUMENTS

| | | | |
|---|---|---|---|
| 2009/0224162 A1* | 9/2009 | Inuiya | G01T 1/244 250/370.09 |
| 2009/0238334 A1* | 9/2009 | Brahme | A61B 6/022 378/41 |
| 2010/0166144 A1* | 7/2010 | Boyd | A61N 5/1049 378/62 |
| 2010/0270462 A1* | 10/2010 | Nelson et al. | 250/252.1 |
| 2012/0043481 A1* | 2/2012 | Mansfield | A61N 5/1045 250/492.1 |
| 2012/0093280 A1* | 4/2012 | Konno | A61B 6/032 378/7 |
| 2012/0132833 A1 | 5/2012 | Freund et al. | |
| 2013/0148777 A1* | 6/2013 | Ikhlef | A61B 6/027 378/19 |

FOREIGN PATENT DOCUMENTS

| | | | | |
|---|---|---|---|---|
| DE | 102009022264 B3 | 8/2010 | | |
| DE | 102009022264 B3 | 8/2010 | | |
| JP | 2002071815 A | 3/2002 | | |
| JP | 2002181950 A | 6/2002 | | |
| JP | 2012057954 A | * | 3/2012 | G01T 7/00 |
| WO | WO-20040614780 A1 | 7/2004 | | |

OTHER PUBLICATIONS

Office Action for Chinese Patent Application No. 201310331427.5 dated Mar. 16, 2016 and English translation thereof.

* cited by examiner

X-RAY DETECTOR

PRIORITY STATEMENT

The present application hereby claims priority under 35 U.S.C. §119 to German patent application number DE 102012213814.5 filed Aug. 3, 2012, the entire contents of which are hereby incorporated herein by reference.

FIELD

At least one embodiment of the invention generally relates to an x-ray detector, especially for a computed tomograph, comprising a number of detector modules disposed next to one another in a stacking direction with a front side which is aligned during operation towards an x-ray radiation source, and with a rear side on the opposite side to the front side.

BACKGROUND

X-ray detectors with a large detector surface for recording measurements of x-rays are frequently of modular construction. In such cases individual modules, which are typically of identical construction and each have a number of measuring cells for recording measurements of x-rays, are attached to a module carrier and in this way are disposed in a regular arrangement. In a similar way to the elements of a mosaic, the measurement cells of all modules then form the detector surface, so that for a joint evaluation of the measurement signals of all measurement cells, x-rays can be measured over a very large surface area. Such a modular construction of an x-ray detector is for example described in the patent application DE 10 2009 022 264 B3, the entire contents of which are incorporated herein by reference.

SUMMARY

At least one embodiment of the invention is directed to an improved x-ray detector.

The related claims contain in part advantageous and in part per se inventive developments of this invention.

The x-ray detector is especially intended for use in a computed tomograph and comprises a module carrier as well as a number of detector modules disposed next to one another in a stacking direction, with a front side which is aligned in operation towards an x-ray source and a rear side on the opposite side to the front side. In addition the x-ray detector, for screening against x-rays which pass during operation through an installation gap between two adjacent detector modules, has at least one absorption element, which is positioned on the rear side of the two adjacent detector modules.

In x-ray detectors with a modular construction x-rays which strike the x-ray detector are typically not completely absorbed and thus recorded as measurements, but instead a part of the x-rays go past the x-ray detector, especially in the area between the detector modules between which, seen microscopically even with mutual surface contact, a type of gap, also called an installation gap, remains. The x-rays passing through this area are not just lost for recording measurements however, they also influence electronic components positioned on the rear side in an undesired manner. This especially reduces the expected lifetime of the electronic components involved.

With an x-ray detector presented here however, at least one absorption element is used to absorb x-rays which are not detected for measuring purposes and pass between two adjacent detector modules, so that electronic components positioned behind the detector, viewed in the direction of propagation of the x-rays, will be protected against potentially damaging x-rays. The absorption element in such cases is expediently disposed, viewed in a direction of propagation of the x-rays, in a line with the x-ray source on one side from which the x-rays are emitted and the installation gap between the two adjacent to detector modules on the other side.

Preferably the absorption element is attached here to one of the two adjacent detector modules. This means that, to attach and position the absorption element, no additional auxiliary structure or carrier structure is provided for the module carrier to which the detector modules are attached in the installed state. Thus the absorption element will also not be attached to the module carrier as part of a separate installation process step. Instead of this the absorption element will be attached to the module carrier together with the corresponding detector module, which does not make the installation of the x-ray detector or the replacement of a detector module more complicated through the use of the absorption element. The advantages of the modular construction during manufacturing and the assembly of the x-ray detector are thus retained.

In accordance with an example embodiment of the x-ray detector, each detector module has a chassis and at least the detector module to which the absorption element is attached comprises a carrier element which connects the absorption element to the chassis, wherein the carrier element is in particular embodied for positioning the absorption element in the stacking direction, i.e. for positioning the absorption element relative to the installation gap. The chassis and the carrier element in such cases are preferably provided by a one-piece, L-shaped profile strip, so that through this on the one hand the absorption element is favorably positioned in the installation state of the x-ray detector and on the other hand through the chassis and also the carrier element, the least possible space is occupied on the rear side. This is of advantage in two respects. On the one hand it allows the x-ray detector to be a more compact design if the individual components from which the x-ray detector is constructed have a comparatively small installation space requirement and on the other hand the components, especially with a given availability of installation space, can be positioned more favorably to the extent that a replacement of individual components in the event of a defect is easier to undertake, since access to the individual components is then especially easy if free space is provided between the individual components.

BRIEF DESCRIPTION OF THE DRAWINGS

Example embodiments of the invention are explained in greater detail below on the basis of a schematic drawing, in which.

Parts corresponding to one another are each labeled with the same reference numerals in all the figures.

DETAILED DESCRIPTION OF THE EXAMPLE EMBODIMENTS

Figure 1:
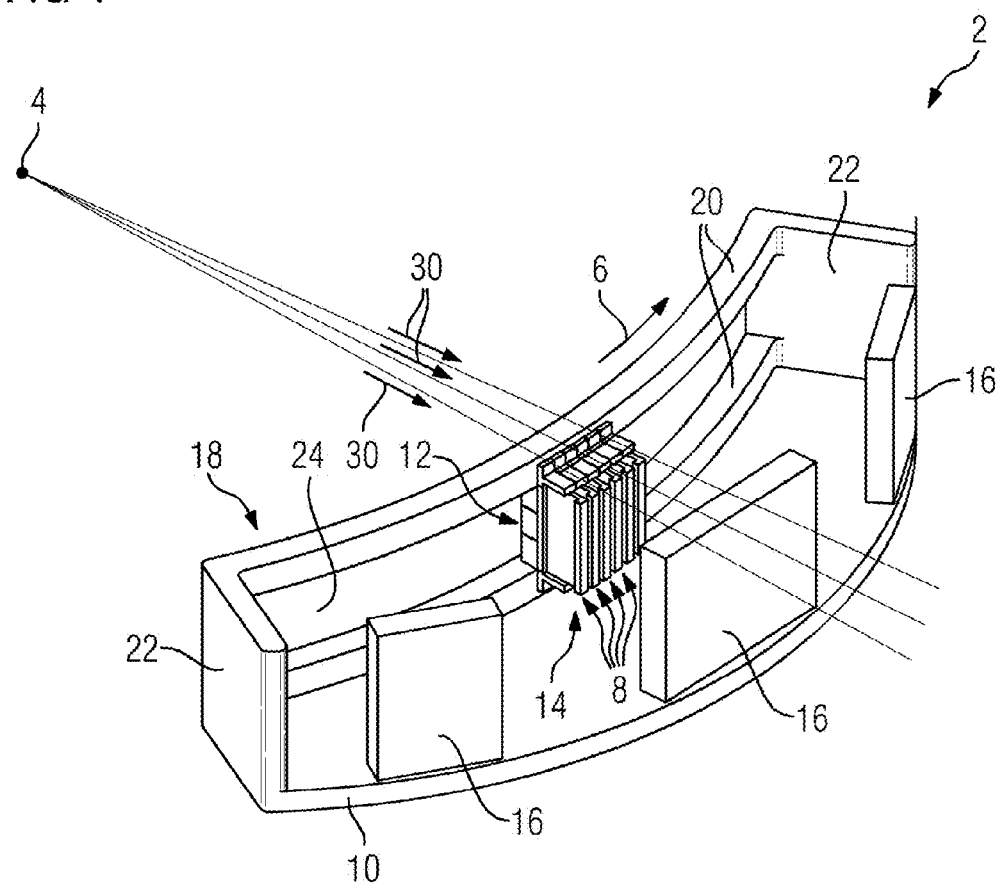
FIG. 1 shows a perspective view of an x-ray source and an x-ray detector with a number of detector modules oriented towards the source.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The x-ray detector is especially intended for use in a computed tomograph and comprises a module carrier as well as a number of detector modules disposed next to one another in a stacking direction, with a front side which is aligned in operation towards an x-ray source and a rear side on the opposite side to the front side. In addition the x-ray detector, for screening against x-rays which pass during operation through an installation gap between two adjacent detector modules, has at least one absorption element, which is positioned on the rear side of the two adjacent detector modules.

In x-ray detectors with a modular construction x-rays which strike the x-ray detector are typically not completely absorbed and thus recorded as measurements, but instead a part of the x-rays go past the x-ray detector, especially in the area between the detector modules between which, seen microscopically even with mutual surface contact, a type of gap, also called an installation gap, remains. The x-rays passing through this area are not just lost for recording measurements however, they also influence electronic components positioned on the rear side in an undesired manner. This especially reduces the expected lifetime of the electronic components involved.

With an x-ray detector presented here however, at least one absorption element is used to absorb x-rays which are not detected for measuring purposes and pass between two adjacent detector modules, so that electronic components positioned behind the detector, viewed in the direction of propagation of the x-rays, will be protected against potentially damaging x-rays. The absorption element in such cases is expediently disposed, viewed in a direction of propagation of the x-rays, in a line with the x-ray source on one side from which the x-rays are emitted and the installation gap between the two adjacent to detector modules on the other side.

Preferably the absorption element is attached here to one of the two adjacent detector modules. This means that, to attach and position the absorption element, no additional auxiliary structure or carrier structure is provided for the module carrier to which the detector modules are attached in the installed state. Thus the absorption element will also not be attached to the module carrier as part of a separate installation process step. Instead of this the absorption element will be attached to the module carrier together with the corresponding detector module, which does not make the installation of the x-ray detector or the replacement of a detector module more complicated through the use of the absorption element. The advantages of the modular construction during manufacturing and the assembly of the x-ray detector are thus retained.

In accordance with an example embodiment of the x-ray detector, each detector module has a chassis and at least the detector module to which the absorption element is attached comprises a carrier element which connects the absorption element to the chassis, wherein the carrier element is in particular embodied for positioning the absorption element in the stacking direction, i.e. for positioning the absorption element relative to the installation gap. The chassis and the carrier element in such cases are preferably provided by a one-piece, L-shaped profile strip, so that through this on the one hand the absorption element is favorably positioned in the installation state of the x-ray detector and on the other hand through the chassis and also the carrier element, the least possible space is occupied on the rear side. This is of advantage in two respects. On the one hand it allows the x-ray detector to be a more compact design if the individual components from which the x-ray detector is constructed have a comparatively small installation space requirement and on the other hand the components, especially with a given availability of installation space, can be positioned more favorably to the extent that a replacement of individual components in the event of a defect is easier to undertake, since access to the individual components is then especially easy if free space is provided between the individual components.

Also advantageous in the sense of a smallest possible installation space requirement is a design in which either the absorption element is screwed to the carrier element with at least one countersunk screw or in which the absorption element is materially connected to the carrier element and especially is glued to the latter.

The necessity of an attachment arises above all when the absorption element is made from a material which differs from the carrier element, while in an embodiment in which the same material is used for the two function elements, the carrier element and the absorption element can also be embodied as a one-piece component. In the event of the same material being used the functions inherent to the carrier element and the absorption element can principally also be realized by the chassis being shaped on the rear side so that the functions of the carrier element and the absorption element can also be realized by the shape.

However an embodiment is preferred in which especially the absorption element is made from a different material, such as tantalum, molybdenum or tungsten for example, while the chassis and the carrier element are made from simple materials, such as steel, copper or brass for example.

But in any event the absorption element is preferably designed so that with this element the x-rays passing between the two adjacent modules are absorbed as completely as possible. In such cases materials with high absorption capability are preferred for the absorption elements where there is little space available, since the space requirement for the absorption element is small in this case, whereas in the case of sufficient available installation space, the use of simple and low-cost materials, such as steel, copper, brass or corresponding alloys with a small absorption capability is preferred, wherein a higher material strength for the absorption element is then selected to make a complete absorption possible.

An embodiment of the x-ray detector in which the detector modules are embodied to be the same and in which an absorption element is attached to each detector module is also advantageous. Accordingly, in the installed state of the x-ray detector an absorption element is assigned to each installation gap between two adjacent detector modules, wherein the respective carrier element, preferably always viewed in the stacking direction, is positioned and attached to the same side on the absorption element and on the chassis. By the use of single, comparatively small and well-positioned absorption elements, compared to an alternative embodiment with a massive and large-surface screening plate, which especially in the stacking direction has approximately the same extent as all detector modules arranged next to one another in this direction taken together, weight and material can be saved to a considerable extent.

In addition an installation gap is preferably provided in each case between the absorption elements of two adjacent detector modules or between an absorption element and the adjacent carrier element, which allows the replacement of a single detector module without dismantling further detector modules regardless of the position of the individual detector module. In this way the service friendliness of the x-ray detector is further increased and the replacement of individual modules if necessary is an especially simple procedure. A corresponding installation space can be realized constructively in such cases for example by the chassis being made increasingly thinner towards the rear side in relation to the material thickness in the stacking direction, so that on the rear side of the chassis space is created in and against the stacking direction, wherein the space on the one side is used to position the carrier element and the absorption element of the corresponding detector module there, while the installation space is created on the opposite side of the chassis.

An x-ray detector 2 described by way of example below is a part of a computed tomography system not shown in any greater detail and, in the assembled state of the computed tomography system, is aligned towards an x-ray source 4.

The x-ray detector 2 in this case in the example embodiment in accordance with FIG. 1 has a curved structure, wherein a number of detector modules 8 disposed next to one another in a stacking direction 6 and constructed in a similar way are mounted on a curved-design module carrier 10. During operation a front side 12 of each detector module 8 points towards the x-ray source 4 and a rear side 14 lying opposite the front side 12 is facing away from the x-ray source 4. Above and beyond this the module carrier 10 serves to accommodate electronic components which are disposed on the rear side 14 of the detector module 8.

The detector module 8 is attached to the module carrier 10 on a support frame 18 which is formed by two curved strips 20 and two sidewalls 22, which together frame a measurement window 24. In the assembled state the detector modules 8 project with their front side 12 into the measurement window 24 and for fixing, the detector modules 8 are attached to the support frame 18 by means of simple screw connections between wing elements 26 sitting on the detector modules 8 and the strips 20.

Figure 2:
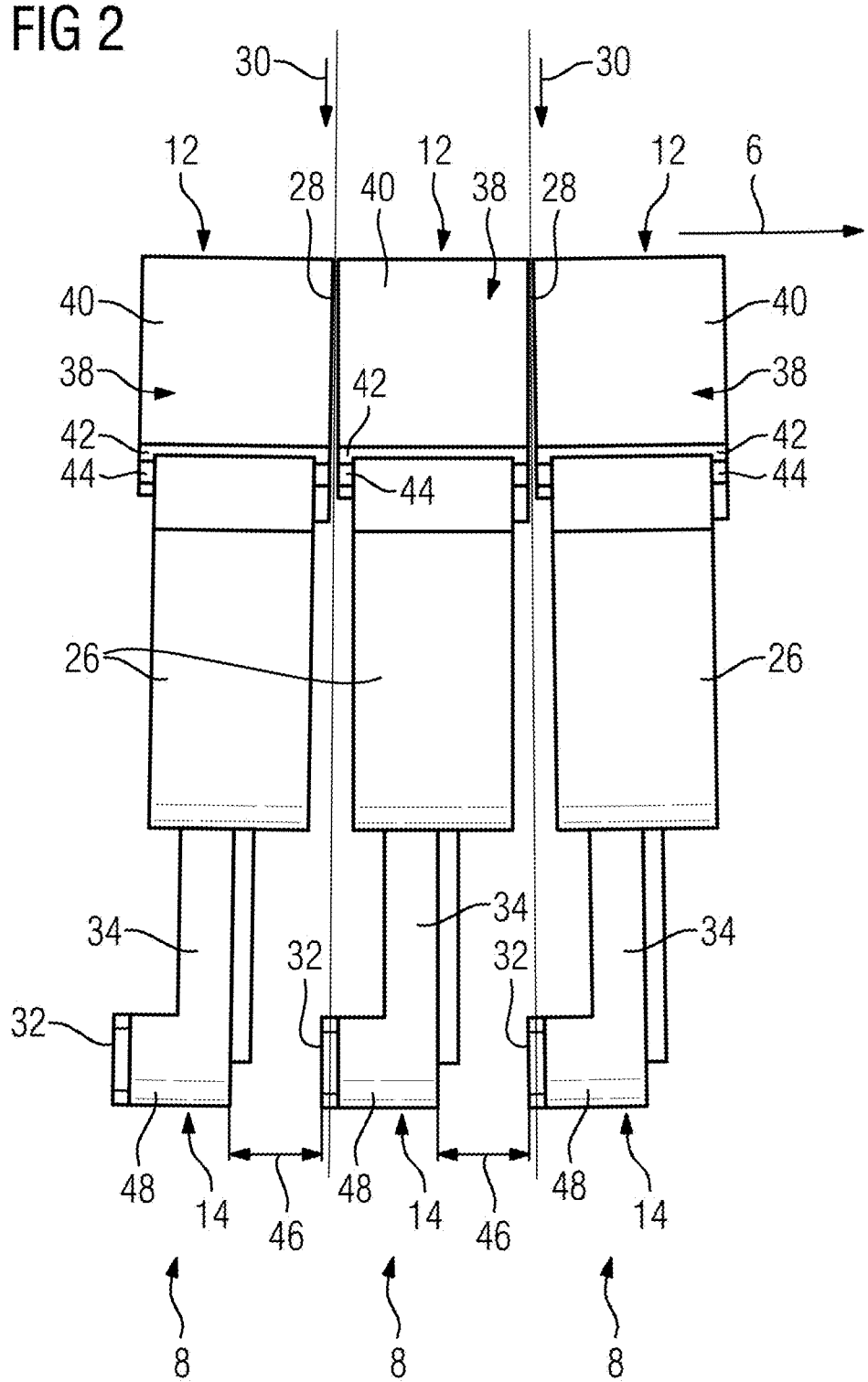
FIG. 2 shows an overhead view of three detector modules and FIG. 3 shows one of the detector modules in a perspective view.

If the detector modules 8 are attached to the module carrier 10, an installation gap 28 remains between the detector modules 8 in each case, which, because of the curved arrangement of the detector modules 8, widens increasingly, viewed in the propagation direction 30 of the x-rays, so that the extent of the installation gap 28 increases in the stacking direction 6, viewed in the direction of propagation 30. This is indicated in FIG. 2. In this figure sections of three detector modules 8 mounted next to one another are shown wherein, for the sake of improved clarity, the module carrier 10 is not depicted as well.

In a modular detector layout in accordance with the prior art, during the operation of the computed tomography system, x-rays emanating from the x-ray source 4 in the direction of propagation 30 increasingly pass through the installation gap 28 through the arrangement of the detector modules 8 and thus, without perceptible attenuation, strike the electronic components 16 on the rear side 14 of the detector modules 8. By contrast, to protect the electronic components 16 and to protect operating personnel, in the computed tomography system with the x-ray detector 2 in accordance with the design presented here, x-rays which are not absorbed in the detector modules 8 are absorbed with the aid of absorption elements 32.

To this end an absorption element 32 is positioned in each case in a line with the x-ray source 4 on one side and an installation gap 28 between two detector modules 8 on the other side, wherein the absorption element is extended for complete absorption of the x-rays passing through the respective installation gap 28, far enough for the absorption elements 32 to cover the projection-n of the extension of the installation gap 18 at the height of the position of the absorption element 32. In this case it should be considered that, through the curved arrangement of the detector modules 8, the installation gap 28 widens from the front side 12 of the detector modules 8 to the rear side 14 and that x-rays passing through the installation gap 28 propagate in a fan shape in the direction of propagation 30.

The embodiment of the detector module 8 shown here not only allows an almost complete absorption of the x-rays passing through the installation 28 by way of the absorption elements 32, it is also advantageous in relation to installation friendliness. The detector modules 8 are constructed for this purpose such that each individual detector module 8 can be replaced if necessary regardless of its position within the arrangement of the detector modules 8 in the module carrier 10, without detector modules 8 adjacent to it having to be removed.

Figure 3:
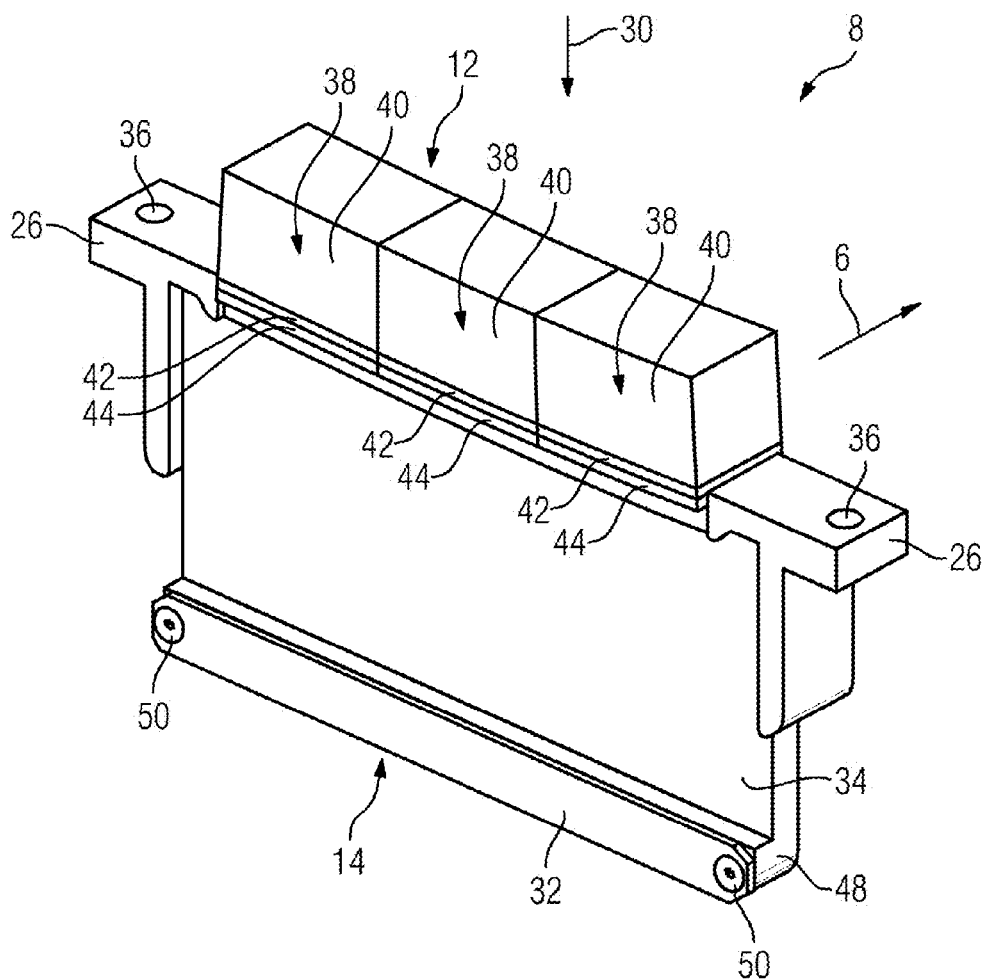

The details of the advantageous construction of the detector modules 8 can be seen by looking at the diagrams in FIG. 2 and FIG. 3 together. The enlarged illustration of a detector module 8 from FIG. 3 shows the principle layout of a detector module 8 consisting of a chassis 34 to which two T-shaped wing elements 36 are attached on each side. Holes 36 are made in the wing elements 26, so that the wing elements 26 and thus the entire detector module 8 can be attached with the aid of screw connections to the strips 20 of the support frame 18. Arranged on the front side 12 of the chassis 34 are three measurement cells 38 which, in the assembled state of the detector module 8 in the module carrier 10, project into the measurement window 24, so that the x-rays emitted by the x-ray source 4 strike the measurement cells 38 either directly or also after passing through an object under examination. The measurement cells 38 here are constructed in accordance with the principle known per se and comprise a collimator 40, a scintillator crystal matrix 42 and a photodiode matrix 44. In the assembled state of the detector module 8 there is finally a technically unavoidable installation gap 28 between the measurement cells 38 of two adjacent detector modules 8 which, viewed macroscopically, rest against one another. The distance between two adjacent chassis 34 on the other hand is advantageously selected and mechanically specified.

An extent in the stacking direction 6 which is as small as possible is provided for the chassis 34, on the one hand in order to create space at the height of the wing elements 26 by this means, which is used if necessary for the arrangement of circuit boards or for cooling components, and on the other hand to create space on the rear side 14 of the detector module 8, which makes it easier to install detector modules 8 on the module carrier 10. The extent of the chassis 34 in the direction of propagation 30 is likewise intentionally selected to be relatively large for the purpose of ease of installation, in order to set the position of the absorption elements 32, viewed in the direction of propagation 30, at the greatest possible distance from the front side 12, since through the curved arrangement of the detector modules 8, an installation gap 46 specified mechanically on the rear side 14 of the detector modules 8 becomes increasingly larger.

In a view from above onto the arrangement of the detector modules 8 in the module carrier 10, as shown in FIG. 2, and thus a direction of view perpendicular to the stacking direction 6 and perpendicular to the direction of propagation 30, an L-shaped embodiment of the rear side 14 of each detector module 8 can be seen, wherein the L-shape is formed by the chassis 34 on one side and a carrier element 48 molded thereon. In the example embodiment chassis 34 and carrier element 48 are manufactured together as a one-piece component from a single material. As an alternative to this however an embodiment is also provided in which the carrier element 48 is manufactured as a separate component made of a different material and is attached to the chassis 34 as part of an installation process step.

Because of the L-shaped design of chassis 34 and carrier element 48 and the selected dimensions for these functional elements, a detector module 8 can be replaced very easily if necessary. To do this the screw connections between the wing elements 26 and the strips 20 are released and the corresponding detector module 8 is moved in the direction of propagation 30 until the measurement cells 38 are roughly at the height of the absorption elements 32 of the two adjacent detector modules 8. Subsequently the detector module 8 to be replaced is shifted in or against the stacking direction 6 so that detector module 8 is subsequently guided in the direction of propagation 30 and can be removed from the arrangement of the detector module 8.

The absorption elements 32 are preferably manufactured from a highly-absorbent material such as tantalum, molybdenum or tungsten for example and the extent of each absorption element in the direction of propagation 30 is chosen as a function of the selected material, so that the x-rays expected to strike the absorption element 32 are absorbed as completely as possible. Dimensions with the values 120 mm×10 mm×1.5 mm are typically provided for the absorption elements 32. Each of the absorption elements 32 is attached with the aid of two countersunk screws (50) to the respective carrier element 48, so that the screw connections do not take up any additional installation space. As an alternative to this, a material connection between each absorption element 23 and the corresponding carrier element 48 is also provided.

The invention is not limited to the example embodiment described hereintofore. Rather, other variants of the invention can also be derived herefrom by the person skilled in the art, without departing from the subject matter of the invention. In particular it is furthermore possible to combine all the individual features described in connection with the example embodiment with one another in a different way also, without departing from the subject matter of the invention.

What is claimed is:

1. An x-ray detector, comprising:
    a plurality of detector modules, each detector module having an array of detector elements, the plurality of detector modules being arranged next to one another in a stacking direction and including a front side, which during operation is oriented towards an x-ray source, a rear side lying opposite the front side, and an installation gap formed between adjacent detector modules; and
    an absorption element, positioned on a rear side of two adjacent detector modules and positioned in line with the x-ray source and the installation gap between the two adjacent detector modules, the absorption element being configured to screen against x-rays which, during operation, pass through the installation gap between the two adjacent detector modules.

2. The x-ray detector of claim 1, wherein the absorption element is attached to one of the two adjacent detector modules.

3. The x-ray detector of claim 2, further comprising a chassis on the rear side of each of the modules, and a carrier element extending from the chassis into the installation gap, wherein the absorption element is attached to an end face of the carrier element that extends into the installation gap and the carrier element connects the absorption element with the chassis, and wherein the carrier element is embodied for positioning the absorption element in the stacking direction.

4. The x-ray detector of claim 3, wherein the chassis and the carrier element are formed by a one-piece, L-shaped profile strip.

5. The x-ray detector of claim 4, wherein the absorption element is screwed onto the carrier element with at least one countersunk screw.

6. The x-ray detector of claim 4, wherein the absorption element includes a material connection to the carrier element.

7. The x-ray detector of claim 6, wherein the absorption element is glued to the carrier element.

8. The x-ray detector of claim 3, wherein the absorption element is screwed onto the carrier element with at least one countersunk screw.

9. The x-ray detector of claim 3, wherein the absorption element includes a material connection to the carrier element.

10. The x-ray detector of claim 9, wherein the absorption element is glued to the carrier element.

11. The x-ray detector of claim 1, wherein the detector modules are embodied to be the same and wherein an absorption element is attached to each detector module.

12. The x-ray detector of claim 11, wherein, between the absorption elements of two adjacent detector modules or between an absorption element and an adjacent carrier element, an installation gap is provided which allows the replacement of individual detector modules without dismantling further detector modules, regardless of the position of the individual detector modules.

13. The x-ray detector of claim 1, wherein the absorption element is embodied for substantially complete absorption of the x-rays.

14. The x-ray detector of claim 1, wherein the absorption element is manufactured from tantalum, molybdenum or tungsten.

15. The x-ray detector of claim 1, wherein the x-ray detector is for a computed tomograph.

16. The x-ray detector of claim 1, further comprising a pair of curved frame rails, wherein each of the detector modules is directly fixed to the curved frame rails.

17. The x-ray detector of claim 1, wherein each of the plurality of detector modules includes a plurality of measurement cells on a front side of a chassis and the absorption element is spaced apart from the measurement cells by the chassis.

18. The x-ray detector of claim 1, wherein adjacent detector modules are arranged next to one another on an arc and an installation gap is formed between adjacent modules.

19. The x-ray detector of claim 1, wherein the installation gap increases in a radiation propagation direction.

20. The x-ray detector of claim 1, wherein the absorption element is in the installation gap between the two adjacent detector modules.

* * * * *